US012507732B2

(12) United States Patent
Emmett et al.

(10) Patent No.: US 12,507,732 B2
(45) Date of Patent: Dec. 30, 2025

(54) INFRARED HEATED AEROSOL-GENERATING ELEMENT

(71) Applicant: PHILIP MORRIS PRODUCTS S.A., Neuchatel (CH)

(72) Inventors: Robert Emmett, Neuchatel (CH); Ana Isabel Gonzalez Florez, St-Sulpice (CH)

(73) Assignee: Philip Morris Products S.A., Neuchatel (CH)

( * ) Notice: Subject to any disclaimer, the term of this patent is extended or adjusted under 35 U.S.C. 154(b) by 932 days.

(21) Appl. No.: 17/421,470

(22) PCT Filed: Jan. 13, 2020

(86) PCT No.: PCT/EP2020/050656

§ 371 (c)(1),
(2) Date: Jul. 8, 2021

(87) PCT Pub. No.: WO2020/148213

PCT Pub. Date: Jul. 23, 2020

(65) Prior Publication Data

US 2022/0079237 A1 Mar. 17, 2022

(30) Foreign Application Priority Data

Jan. 14, 2019 (EP) .................................... 19151641

(51) Int. Cl.
*A24F 40/46* (2020.01)
*A24B 15/167* (2020.01)
(Continued)

(52) U.S. Cl.
CPC ............ *A24F 40/46* (2020.01); *A24B 15/167* (2016.11); *A24F 1/30* (2013.01); *A24F 40/20* (2020.01);
(Continued)

(58) Field of Classification Search
CPC ........ A24F 40/46; A24F 40/465; A24F 40/20; A24F 1/30; A24B 15/167; H05B 11/00; H05B 3/06; H05B 6/105
(Continued)

(56) References Cited

U.S. PATENT DOCUMENTS 5,499,636 A * 3/1996 Baggett, Jr. .............. A24C 5/01 131/194
5,666,976 A * 9/1997 Adams ..................... A24D 1/20 131/194
(Continued)

FOREIGN PATENT DOCUMENTS

EP 1367450 12/2003
EP 3075266 10/2016
(Continued)

OTHER PUBLICATIONS

Office Action issued in Japan for Application No. 2021-539537 dated Sep. 12, 2022 (13 pages). English translation included.
(Continued)

*Primary Examiner* — Hae Moon Hyeon
(74) *Attorney, Agent, or Firm* — Mueting Raasch Group

(57) ABSTRACT

An aerosol-generating element for generating an aerosol in a shisha device, the aerosol-generating element includes a receptacle for receiving an aerosol-forming substrate and a photonic device configured to generate a beam of IR radiation. The aerosol-generating element is arranged to heat the aerosol-forming substrate by directing the beam of IR radiation onto the aerosol-forming substrate. The photonic device includes an IR laser diode. The range of wavelengths of the beam of IR radiation is from 1300 nanometers to 2000 nanometers.

18 Claims, 6 Drawing Sheets

(51) Int. Cl.

| | |
|---|---|
| ***A24F 1/30*** | (2006.01) |
| ***A24F 40/20*** | (2020.01) |
| ***A24F 40/465*** | (2020.01) |
| ***H05B 11/00*** | (2006.01) |
| *H05B 3/06* | (2006.01) |
| *H05B 6/10* | (2006.01) |

(52) U.S. Cl.
CPC ............ *A24F 40/465* (2020.01); *H05B 11/00* (2013.01); *H05B 3/06* (2013.01); *H05B 6/105* (2013.01)

(58) Field of Classification Search
USPC .......................................................... 131/328
See application file for complete search history.

(56) References Cited

U.S. PATENT DOCUMENTS

| | | | | |
|---|---|---|---|---|
| 5,878,752 | A * | 3/1999 | Adams | A24F 40/465 131/194 |
| 5,934,289 | A * | 8/1999 | Watkins | A24F 40/46 131/194 |
| 9,428,409 | B2 * | 8/2016 | Foret | B01J 19/2405 |
| 9,895,641 | B2 * | 2/2018 | Goldstein | B01D 46/62 |
| 10,561,172 | B2 * | 2/2020 | Armoush | A24F 40/40 |
| 10,842,196 | B2 | 11/2020 | Frobisher | |
| 11,707,085 | B2 * | 7/2023 | Armoush | A24F 1/30 219/634 |
| 11,797,797 | B2 * | 10/2023 | Florack | G06K 7/1408 |
| 2010/0319716 | A1 | 12/2010 | Tao | |
| 2017/0020193 | A1 * | 1/2017 | Davis | A61M 15/06 |
| 2017/0251718 | A1 | 9/2017 | Armoush | |
| 2018/0271150 | A1 * | 9/2018 | Sparklin | A24F 1/30 |
| 2021/0345674 | A1 * | 11/2021 | Emmett | A24F 1/30 |
| 2022/0079237 | A1 * | 3/2022 | Emmett | H05B 11/00 |
| 2022/0175039 | A1 | 6/2022 | Spencer | |
| 2022/0264949 | A1 * | 8/2022 | Graf | A24F 40/20 |
| 2022/0330613 | A1 * | 10/2022 | Emmett | A24F 40/20 |

FOREIGN PATENT DOCUMENTS

| | | | |
|---|---|---|---|
| JP | 2002-514910 | 5/2002 | |
| JP | 2004-001524 | 1/2004 | |
| JP | 2016-195585 | 11/2016 | |
| JP | 2018-516560 | 6/2018 | |
| WO | WO 2014/102092 | 7/2014 | |
| WO | WO-2014110119 A1 * | 7/2014 | A24F 40/30 |
| WO | WO 2015/177255 | 11/2015 | |
| WO | WO 2016/019573 | 2/2016 | |
| WO | WO-2016019573 A1 * | 2/2016 | A24F 1/30 |
| WO | WO 2016/184783 | 11/2016 | |
| WO | WO-2016184783 A1 * | 11/2016 | A24B 15/167 |
| WO | WO 2017/186944 | 11/2017 | |
| WO | WO-2019138045 A1 * | 7/2019 | A24F 47/008 |

OTHER PUBLICATIONS

PCT Search Report and Written Opinion for PCT/EP2020/050656 dated Jan. 29, 2020 (11 pages).
Office Action issued in Japan for Application No. 2023-082373 dated Jul. 8, 2024 (16 pages). English translation included.

* cited by examiner

5A

5B

INFRARED HEATED AEROSOL-GENERATING ELEMENT

This application is a U.S. National Stage Application of International Application No. PCT/EP2020/050656 filed Jan. 13, 2020, which was published in English on Jul. 23, 2020, as International Publication No. WO 2020/148213 A1. International Application No. PCT/EP2020/050656 claims priority to European Application No. 19151641.8 filed Jan. 14, 2019.

The present invention relates to an aerosol-generating element for generating an aerosol in a shisha device. More particularly, this disclosure relates to an aerosol-generating element, wherein an aerosol is generated via heating an aerosol-forming substrate by means of infrared (IR) radiation. The present invention further relates to a shisha device comprising the aerosol-generating element, to an aerosol-generating system comprising both the shisha device and an aerosol-generating article, and to a method for forming an aerosol in a shisha device.

BACKGROUND

Traditional shisha devices are used to smoke a tobacco substrate and are configured such that vapor and smoke pass through a water basin before inhalation by a user. Shisha devices may include one outlet or more than one outlet so that the device can be used by more than one user at a time. Use of shisha devices is considered by many to be a leisure activity and a social experience.

Traditional shisha devices employ charcoal to heat or combust the tobacco substrate to generate an aerosol for inhalation by a user. High levels of carbon monoxide and undesired combustion by-products like polycyclic aromatic hydrocarbons as well as other harmful and potentially harmful constituents might be produced during use of a traditional shisha device. The carbon monoxide may be generated by the charcoal as well as by the combustion of the tobacco substrate.

One way to reduce the production of carbon monoxide and combustion by-products is to use electrical heaters instead of charcoal, for example resistive heaters, which heat the tobacco substrate to a temperature sufficient to produce an aerosol from the substrate without combusting the substrate.

However, in comparison to traditional charcoal operated shisha devices electrically heated devices might suffer from lower total aerosol mass, lower visible aerosol, lower aerosol volume or any combination thereof. The reduction in one or more of these aerosol properties may be particularly pronounced during the first puffs due to poorer contact between the substrate and the heated surface. Consequently, a time taken to heat the substrate until a first puff is available for consumption (TT1P) may be relatively long compared to conventional charcoal heated shisha devices.

In traditional shishas the charcoal provides a unique heating characteristic as it does not simultaneously and evenly heat the entire aerosol-forming substrate at the same time. Moving the charcoal to different points at the desired pace is an essential part of the ritual and smoking experience of traditional shishas.

It would be desirable to provide a shisha device which reduces the production of carbon monoxide and undesired combustion by-products in comparison to traditional charcoal shisha devices.

It would be desirable to provide a shisha device with a heating characteristic to match, resemble, or mimic the ritual and smoking experience of traditional shishas.

BRIEF SUMMARY

In various aspects of the present invention there is provided an aerosol-generating element for generating an aerosol in a shisha device. The aerosol-generating element comprises a receptacle for receiving an aerosol-forming substrate and a photonic device configured to generate a beam of IR radiation. The aerosol-generating element is arranged to heat the aerosol-forming substrate by directing the beam of IR radiation onto the aerosol-forming substrate.

The photonic device thus acts as an IR emitter. Generally, the aerosol-generating element of the invention uses IR radiation to heat one or more components of the aerosol-forming substrate. In some embodiments, the aerosol-forming substrate may comprise tobacco, as will later be described.

The aerosol-generating element of the invention therefore provides an alternative heating system, wherein the aerosol-forming substrate is heated by absorption of IR radiation. Heating with IR radiation brings the benefit of high speed, flexibility and efficient heating.

In contrast to conduction or convection, radiation transfers energy via electromagnetic waves. As a consequence there is no requirement for the presence of a medium or “heat carrier”. This can help to shorten the time required to bring the aerosol-forming substrate to the desired temperature. This can be particularly beneficial during a period of pre-heating the aerosol-forming substrate. Moreover, no physical contact between the aerosol-generating element and the aerosol-forming substrate is needed. The aerosol-generating element of the invention allows contactless heating of the aerosol-forming substrate.

The aerosol-generating element may be used with an aerosol-forming substrate to produce aerosol. In particular, the aerosol-generating element may receive and heat the aerosol-forming substrate to generate aerosol. The aerosol-forming substrate may be heated, but not burned, by the aerosol-generating element. The aerosol-generating element may comprise a heating element. The heating element may comprise an electric heating element.

In some embodiments, the aerosol-generating element may comprise features of a conventional shisha device, such as any of: a receptacle for receiving an aerosol-forming substrate, a cover plate for covering the receptacle, a cartridge comprising aerosol-forming substrate, a foil for covering the cartridge, and at least one charcoal pellet for heating the aerosol-forming substrate.

Different materials absorb IR radiation at different frequencies. A careful choice of wavelength can promote that certain substances are efficiently heated while others remain at substantially lower temperatures. Accordingly, the aerosol-generating element of the invention allows for targeted heating as a function of one or more components of the aerosol-forming substrate. The targeted IR radiation does not necessarily heat the surrounding air.

This means more efficient heating can be achieved. Also, more design freedom is available, since there an air gap does not cause large thermal losses as in a conventional electrically heated shisha system. Thus, potentially less insulating material is necessary.

IR beams can be manipulated to irradiate only a specific part of the aerosol-forming substrate. Also, IR absorption is known to have a low transmittance. IR beams allow for heating only an irradiated part of the aerosol-forming substrate. Accordingly, the aerosol-generating element of the invention allows for targeted heating as a function of space.

Another advantage of the IR heating means of the present invention is fast thermal response. The aerosol-forming substrate may be substantially heated during the time of irradiation, only.

Also, IR heating provides high flexibility to the spatial arrangement of the IR emitter and the substrate. This opens a wide scope of options to the geometrical design of the aerosol-generating element and the shisha device.

DETAILED DESCRIPTION

In some embodiments, the IR beam may undergo manipulation between the photonic device and the aerosol-forming substrate. In some embodiments, manipulation of an IR beam is preferably facilitated by means of an optical element.

In some embodiments, the aerosol-generating element further comprises an optical element being located between the photonic device and the receptacle and being configured to manipulate the beam of IR radiation.

The term "manipulation of the beam of IR radiation" may comprise any changes in a light path of a beam of IR radiation. Examples include any of reflecting an IR beam, deflecting an IR beam, converging an IR beam, and diverging an IR beam.

The term "optical element" comprises any element which is capable of manipulating the beam of IR radiation. Examples comprise mirrors, curved mirrors, lenses, convex lenses and concave lenses. Concave lenses may diverge the IR beam and thus may lower the energy density of the IR beam. Such a configuration may be particularly useful to maintain the substrate at a predetermined lower temperature for long time intervals where no puffing occurs, for example in the pre-heat phase or in between puffs. Convex lenses may converge the IR beam and thus may increase the energy density of the IR beam. A converged, or focused, beam may allow a rapid depletion of specific areas of the substrate.

According to one or more embodiments, the optical element of the aerosol-generating element of the invention may be arranged on an optical mount. The optical mount may be moveable. The movement of the optical mount may be executed mechanically, electrically, or electromechanically. Movement may be accomplished by any suitable means. Examples may comprise stepper motors, eccentric screws, or both stepper motors and eccentric screws. Movement may be executed manually by a user. Preferably, movement is executed automatically by means of electronically controlled components.

A position of the optical element may be adjustable during use by the optical mount. The optical element arranged on the optical mount allows for manipulating the beam of IR radiation. The optical element arranged on the optical mount allows for dynamically manipulating the beam of IR radiation.

The term "movable optical mount" comprises any kind of mount of the optical element which allows moving the optical element into different positions or directions relative to the incident IR beam. Thereby, the manipulation of the IR beam caused by the optical element may be altered by moving the optical element via the movable optical mount.

The term "dynamically manipulating the beam of IR radiation" means that the beam of IR radiation may be manipulated during use of the aerosol-generating element in a shisha device.

The term "during use" may refer to any instant of time when a user operates the shisha device. "During use" may refer to any instant of time when the shisha device is switched on. "During use" may refer to any instant of time when power is supplied to the photonic device. "During use" may refer to an instant of time during a puff or between puffs.

Manipulation of the IR beam may be executed via the movable optical mount. Mechanically, electronically, or electromechanically, movement may be accomplished by any suitable means. Examples may comprise stepper motors, eccentric screws, piezoelectric screws or combinations thereof. Movement may be executed manually by a user. Preferably, movement is executed automatically by means of electronically controlled components.

Generally, progress of the dynamic manipulation of the IR beam may be controlled by a computer program operating on an electronic circuitry. A part of the dynamic manipulation or the entire dynamic manipulation may be controlled automatically, for example, according to a computer program. The computer program may be stored on non-transitory computer readable medium. One or more aspects of the dynamic manipulation may be partly or entirely controllable by a user. For example, a user may control a pace of the dynamic manipulation. A user may control a location of the substrate to which the IR beam is guided. For example, a means may be included which allows for a user to enter commands and to thereby dynamically manipulate the IR beam according to her or his preferences. Such means may be any suitable means as known to a person skilled in the art. An example is a control unit comprising a user interface. In some embodiments, the user interface may comprise electronic or mechanical or electromechanical user interface means.

Dynamically manipulating the beam of IR radiation may allow for dynamically manipulating a trajectory of the beam. Thereby, dynamic manipulation of the IR beam allows for different portions of the aerosol-forming substrate to be irradiated. Thereby dynamic manipulation of the IR beam allows for selective irradiation of the aerosol-forming substrate, which may allow for selective aerosol generation. Dynamic manipulation of the IR beam may allow for sequential irradiation of the aerosol-forming substrate. With the aerosol-generating element of the invention, different portions of the aerosol-forming substrate may be heated sequentially. The sequential heating may be controlled partly or entirely by a user. The aerosol-generating element of the invention may resemble the movement of the charcoal over the substrate and the traditional ritual of the smoking experience may be further preserved.

The photonic device of the aerosol-generating element functions as an IR emitter. For choosing a suitable IR emitter, the composition of the aerosol-forming substrate should be considered. The IR emitter may be selected in view of one or more IR emitter properties. One or more IR emitter properties may be selected in dependence on one or more components of the aerosol-forming substrate. For example, said one or more IR emitter properties may comprise any one or combination of: wavelength, frequency, spot size, swept source, pulsed vs continuous wave, energy and power. For example, a wavelength of the IR emitter may be selected in view of the absorption of the IR light by one or more components of the aerosol-forming substrate. A wavelength of the IR emitter may be selected in view of the transmission of the IR light by one or more components of the aerosol-forming substrate.

A wavelength of the IR emitter may correspond to the IR absorption bands of a component of the aerosol-forming substrate. A wavelength of the IR emitter may correspond to the IR absorption bands of two or more components of the aerosol-forming substrate.

For example, a wavelength of the IR emitter may correspond to the IR absorption bands of one or more of glycerol, molasses, sugars, inverted sugars, tobacco, tobacco derivate, or any other component of the aerosol-forming substrate as will later be described.

The term "a wavelength" may refer to a single wavelength, a plurality of single wavelengths, a range of wavelengths, a plurality of ranges of wavelengths, or any combination thereof.

For example, there may be a relatively large amount of glycerol present in the aerosol-forming substrate and the wavelength requirements may be adapted to the strong absorption bands of glycerol. Glycerol's strong IR absorption bands are found at wavelengths of the IR light between 1300 nanometers and 2000 nanometers. Accordingly, the IR emitter may emit IR light in a range of from 800 nanometers to 2300 nanometers, preferably from 1300 nanometers to 2000 nanometers.

In some embodiments, the IR emitter may emit IR light at a power in the range of from 0.1 Watt to 30 Watts, preferably from 0.5 Watt to 25 Watts, more preferably from 1 Watt to 20 Watts, and more preferably from 1 Watt to 3 Watts. In some embodiments, a relatively high power is used for pre-heating the aerosol-forming substrate. In some embodiments, a relatively lower power is used for puff on demand.

In "puff on demand" operation the IR emitter must be able to bring a minimum amount of aerosol forming substrate required to generate aerosol for one puff up to 250 degree Celsius within 5 seconds, preferably within 2 seconds, preferably within 1 second. The minimum amount of aerosol forming substrate required to generate aerosol for one puff may amount to up to 1.2 cubic centimeter.

In some embodiments, the energy density of the beam of IR radiation may be in a range of from 0.010 Watt per square centimeter to 30 Watts per square centimeter, preferably from 0.050 Watt per square centimeter to 6 Watts per square centimeter, and more preferably from 0.100 Watts per square centimeter to 3 Watts per square centimeter.

In some embodiments, the diameter of the beam of IR radiation may be in the range of from 1 millimeter to 110 millimeters, preferably from 2 millimeters to 100 millimeters, and more preferably from 5 millimeters to 80 millimeters. Generally, relatively large diameters are used for preheating the aerosol-forming substrate. In some embodiments, relatively small diameters are used for puff on demand.

The term "diameter of the IR beam" may refer to the diameter of the area of the aerosol-forming substrate which is directly irradiated by the beam of IR radiation.

The distance between the IR emitter and the aerosol-forming substrate may be up to 30 centimeters, preferably up to 20 centimeters, and more preferably up to 10 centimeters.

Control over the intensity of the heating of the aerosol-forming substrate by the IR emitter may be achieved by moving the wavelength of heating slightly off resonance from that already selected. This may advantageously maximize absorption of the desired compound of the aerosol-forming substrate, for example glycerol. In some embodiments, control over the intensity of the heating of the aerosol-forming substrate may be achieved by changing the power supplied to the IR emitter.

In some embodiments, the IR emitter may comprise a laser. In some embodiments, the IR emitter may comprise a laser diode. The photonic device of the aerosol-generating element of the invention may comprise an IR laser diode.

The photonic device of the invention may be used as the only heating means for heating the aerosol-forming substrate. In some embodiments, the photonic device of the invention may be used in combination with one or more additional heating means. Any heating means may be used as an additional heating means. Examples comprise electrical heating means, such as a resistive heating means, inductive heating means or a combination of both a resistive heating means and an inductive heating means.

In one or more embodiments, the aerosol-generating element may additionally comprise an additional heating means, such as an electrical heating means, configured for heating the aerosol-forming substrate received in the receptacle. The additional electrical heating means may be in thermal contact with the receptacle. In one or more embodiments, at least a part of the receptacle may be formed by the additional electrical heating means.

Preferably, the additional heating means comprises a resistive heating means. For example, the additional heating means may comprise one or more resistive wires or other resistive elements. The resistive wires may be in contact with a thermally conductive material to distribute heat produced over a broader area. Examples of suitable conductive materials include aluminium, copper, zinc, nickel, silver, and combinations thereof. For purposes of this disclosure, if resistive wires are in contact with a thermally conductive material, both the resistive wires and the thermally conductive material are part of the heating means that forms at least a portion of the surface of the receptacle.

In some examples, an additional heating means comprises an inductive heating means. For example, the additional heating means may comprise a susceptor material that forms a surface of the receptacle. As used herein, the term 'susceptor' refers to a material that is capable to convert electromagnetic energy into heat. When located in an alternating electromagnetic field, typically eddy currents are induced and hysteresis losses may occur in the susceptor causing heating of the susceptor. As the susceptor is located in thermal contact or close thermal proximity with the aerosol-forming substrate, the substrate is heated by the susceptor such that an aerosol is formed. Preferably, the susceptor is arranged at least partially in direct physical contact with the aerosol-forming substrate or the cartridge containing the aerosol-forming substrate.

The susceptor may be formed from any material that can be inductively heated. Preferably, the susceptor may be formed from any material that can be inductively heated to a temperature sufficient to generate an aerosol from the aerosol-forming substrate. Preferred susceptors comprise a metal or carbon. A preferred susceptor may comprise or consist of a ferromagnetic material, for example ferritic iron, a ferromagnetic alloy, such as ferromagnetic steel or stainless steel, and ferrite. A suitable susceptor may be, or comprise, aluminium.

Preferred susceptors are metal susceptors, for example stainless steel. However, susceptor materials may also comprise or be made of graphite, molybdenum, silicon carbide, aluminium, niobium, Inconel alloys (austenite nickel-chromium-based superalloys), metallized films, ceramics such as for example zirconia, transition metals such as for example Fe, Co, Ni, or metalloids components such as for example B, C, Si, P, Al.

A susceptor preferably comprises more than 5%, preferably more than 20%, preferably more than 50% or 90% of ferromagnetic or paramagnetic materials. Preferred susceptors may be heated to a temperature in excess of 250 degrees Celsius. Suitable susceptors may comprise a non-metallic core with a metal layer disposed on the non-metallic core, for example metallic tracks formed on a surface of a ceramic core.

The shisha device may also comprise one or more induction coil configured to induce eddy currents and/or hysteresis losses in a susceptor material, which results in heating of the susceptor material. A susceptor material may also be positioned in the cartridge containing the aerosol generating substrate. A susceptor element comprising the susceptor material may comprise any suitable material, such as those described in, for example, PCT Published Patent Applications WO 2014/102092 and WO 2015/177255.

The additional heating means, whether an inductive heating means or a susceptor, may be thermally coupled with a heating block. The additional heating means may be in direct contact with the heating block. The heating block may comprise any suitable thermally conductive material. In some embodiments, the heating block comprises aluminium, alumina, or an alumina ceramic. The heating block may form the exterior surface of the additional heating means.

The aerosol-generating element may heat the aerosol-forming substrate by the above mentioned heating means to generate an aerosol. In some embodiments, the aerosol-forming substrate is preferably heated, to a temperature in a range from about 150° C. to about 250° C.; more preferably from about 180° C. to about 230° C. or from about 200° C. to about 230° C.

In some embodiments, the IR beam may be conceived as a depletion agent, meaning that aerosol formation takes place substantially only where the IR beam irradiates the aerosol-forming substrate. Where an electrical heating means is additionally provided, in some embodiments, the electrical heating means may maintain the substrate at a constant temperature below the temperature of volatilisation of the aerosol-forming substrate. The IR heating means may provide the additional energy to heat the compounds above the temperature of volatilisation of the aerosol-forming substrate, generating an aerosol.

In some embodiments, the IR beam may help to provide fast initial volatilisation of a portion of the aerosol-forming substrate, whilst an additional electrical heating means heats up the majority of the aerosol-forming substrate over a longer period. In some conventional electrical heating arrangements, there may be a relatively large delay between turning on the electrical shisha device to supply energy to the electrical heating means and a time at which a user may take a first puff. This time period is known in the art as "time to first puff" (TT1P). Therefore combining an IR beam and an additional electrical heating means may help to reduce the TT1P, by providing aerosol for the first one, two or few puffs via IR heating alone, until the additional electrical heating means is able to bring a relatively larger volume of aerosol-forming substrate up to a volatilisation temperature.

In one or more embodiments, the aerosol-generating element comprises a window. The window may be located between the photonic device and the receptacle. In one or more embodiments, the window may be substantially transparent to the beam of IR radiation. The window may be located at a position in between the optical element and the receptacle. In these embodiments, IR light may be transmitted into the receptacle through the window. The window may therefore prevent residue accumulation on the surface of the IR emitter or the optical element. The window serves for preventing the IR emitter and optical element from being contaminated. Residues like dirt and debris from heating the aerosol-forming substrate might otherwise accumulate at the optical element or IR emitter or both. The window is less sensitive to such contamination and may be easier to clean. To this end, the window may be a removable component that can be detached from the device for cleaning.

In one or more embodiments, the optical element comprises a mirror for reflecting the beam of IR radiation. The mirror may act as an optical element which manipulates the beam of IR radiation by means of reflection of the beam in the mirror. The dimensions of the irradiated portion of the aerosol-forming substrate may be manipulated by reflecting the beam of IR radiation in the mirror. The mirror may be a curved mirror.

Preferably, the radius or effective radius of the curved mirror is not fixed but can be manipulated dynamically. Suitable means for manipulating the radius of the curved mirror include but are not limited to water or air pressure. Suitable variable radius mirrors are commercially available and allow for dynamically changing the beam characteristics during operation. To this end the mirrors surface is formed from flexible material. By changing the applied water or air pressure the flexible mirror surface is deformed. This deformation changes the curvature of the mirror and allows for dynamically manipulating the beam of IR radiation.

Alternatively or in addition, the position of the IR beam on the aerosol-forming substrate may be manipulated dynamically by a movable optical mount on which the mirror might be arranged. For example, the angle of reflection of the mirror may be dynamically manipulated using a micro-structured assembly of stepper motors.

In one or more embodiments, the beam of IR radiation comprises an incident beam of IR radiation propagating from the photonic device towards the curved mirror and a reflected beam of IR radiation propagating from the curved mirror to the receptacle, wherein there is an angle between the incident beam of IR radiation and the reflected beam of IR radiation, preferably, wherein the angle is about 90 degrees. Thus, the beam is deflected by an angle, preferably by an angle of about 90 degrees, by means of the curved mirror. Deflecting the beam of IR radiation by a predetermined angle along its way from the photonic device to the receptacle may allow for the aerosol-generating element to be designed in different geometries. For example, if the beam is deflected by a predetermined angle the photonic device must not necessarily be placed in linear relationship to the irradiated surface of the aerosol-forming substrate comprised in the receptacle. This may allow for a more compact design of a shisha device.

In one or more embodiments, the optical element may comprise an lens. The optical element may comprise one or more of a concave lens for diverging the beam of IR radiation in a direction towards the receptacle and a convex lens for converging the beam of IR radiation in a direction towards the receptacle.

Concave lenses may diverge the IR beam and thus may lower the energy density of the IR beam. Such a configuration may be particularly useful to maintain the substrate at a predetermined lower temperature for long time intervals where no puffing occurs, for example in the pre-heat phase or in between puffs.

Convex lenses may converge the IR beam and thus may increase the energy density of the IR beam. A converged, or focused, beam may allow a rapid depletion of specific areas of the substrate.

In one or more embodiments, the optical element may comprise a variable lens that may be switched between convex and concave shape. Similar to the variable mirrors described above, these variable lenses may be made from flexible material and may be switched by changing an applied water or air pressure. Again the pressure induced deformation may change the curvature of the lens.

In embodiments, wherein the radius of the curved mirror is not fixed but can be manipulated dynamically, similar to the lenses, the curved mirror may be used as an optical element to selectively converge or diverge or both converge and diverge the IR beam. By increasing the radius of curvature of the curved mirror, the beam diverges in a direction towards the receptacle. By decreasing the radius of curvature of the curved mirror the beam converges in a direction towards the receptacle.

In one or more embodiments, the optical element may be connected to a control unit. The control unit may be arranged for a user to select a specific portion of the aerosol-forming substrate, received in the receptacle, to be heated by IR radiation. The control unit comprises a user interface which allows the user to enter commands and to thereby manipulate the IR beam according to her or his preferences. The user interface may comprise a touch screen where the user can signal which area of the substrate should be heated. The optical mount, which may be movable, for example, by stepper motors, may then be activated to direct the IR beam to the signalled point in the substrate. Additionally, the display may show which parts of the substrate have already been consumed, or at least irradiated. A control unit may be included to maximize the ritual preservation in non-charcoal operated shishas. Generally, any suitable aerosol-forming substrate may be used in accordance to the invention. The aerosol-forming substrate is preferably a substrate capable of releasing volatile compounds that may form an aerosol. The volatile compounds may be released by heating the aerosol-forming substrate. The aerosol-forming substrate may be solid or liquid or comprise both solid and liquid components. Preferably, the aerosol-forming substrate comprises a solid.

The aerosol-forming substrate may comprise nicotine. The nicotine containing aerosol-forming substrate may comprise a nicotine salt matrix. The aerosol-forming substrate may comprise plant-based material. The aerosol-forming substrate preferably comprises tobacco, and preferably the tobacco containing material contains volatile tobacco flavor compounds, which are released from the aerosol-forming substrate upon heating. The aerosol-forming substrate may comprise homogenized tobacco material. Homogenized tobacco material may be formed by agglomerating particulate tobacco. The aerosol-forming substrate may alternatively or additionally comprise a non-tobacco-containing material. The aerosol-forming substrate may comprise homogenized plant-based material.

The aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco.

The aerosol-forming substrate may comprise at least one aerosol-former. The aerosol-former may be any suitable known compound or mixture of compounds that, in use, facilitates formation of a dense and stable aerosol and that is substantially resistant to thermal degradation at the operating temperature of the shisha device. Suitable aerosol-formers are well known in the art and include, but are not limited to: polyhydric alcohols, such as triethylene glycol, 1,3-butanediol and glycerol; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerol. The aerosol-forming substrate may comprise other additives and ingredients, such as flavorants. The aerosol-forming substrate preferably comprises nicotine and at least one aerosol-former. In a particularly preferred embodiment, the aerosol-former is glycerol.

The aerosol-forming substrate may comprise any suitable amount of an aerosol-former. For example, the aerosol-former content may be equal to or greater than 5% on a dry weight basis, and preferably between greater than 30% by weight on a dry weight basis. The aerosol-former content may be less than about 95% on a dry weight basis. Preferably, the aerosol-former content is up to about 55%.

The aerosol-forming substrate may be provided on or embedded in a thermally stable carrier. The carrier may comprise a thin layer on which the substrate deposited on a first major surface, on second major outer surface, or on both the first and second major surfaces. The carrier may be formed of, for example, a paper, or paper like material, a non-woven carbon fiber mat, a low mass open mesh metallic screen, or a perforated metallic foil or any other thermally stable polymer matrix. Alternatively, the carrier may take the form of powder, granules, pellets, shreds, spaghettis, strips or sheets. The carrier may be a non-woven fabric or fiber bundle into which tobacco components have been incorporated. The non-woven fabric or fiber bundle may comprise, for example, carbon fibers, natural cellulose fibers, or cellulose derivative fibers.

In some examples, the aerosol-forming substrate comprises one or more sugars in any suitable amount. Preferably, the aerosol-forming substrate comprises invert sugar, which is a mixture of glucose and fructose obtained by splitting sucrose. Preferably, the aerosol-forming substrate comprises from about 1% to about 40% sugar, such as invert sugar, by weight. In some example, one or more sugars may be mixed with a suitable carrier such as cornstarch or maltodextrin.

In some examples, the aerosol-forming substrate comprises one or more sensory-enhancing agent. Suitable sensory-enhancing agents include flavorants and sensation agents, such as cooling agents. Suitable flavorants include natural or synthetic menthol, peppermint, spearmint, coffee, tea, spices (such as cinnamon, clove and/or ginger), cocoa, vanilla, fruit flavors, chocolate, *eucalyptus*, geranium, eugenol, agave, juniper, anethole, linalool, and any combination thereof.

In some examples, the aerosol-forming substrate is in the form of a suspension. For example, the aerosol-forming substrate may be in the form of a molasses. As used herein, "molasses" means an aerosol-forming substrate composition comprising about 25% or more sugar. For example, the molasses may comprise at least about 30% by weight sugar, such as at least about 40% by weight sugar. Typically, the molasses will contain less than about 60% by weight sugar, such as less than about 50% by weight sugar.

The term "tobacco material" refers to a material or substance comprising tobacco, which comprises tobacco blends or flavoured tobacco, for example.

As used herein, the term "aerosol" as used when discussing a flow of aerosol, may refer to aerosol, air containing aerosol or vapour, or aerosol-entrained air. Air containing vapour may be a precursor to air containing aerosol, for example, after being cooled or after being accelerated.

The IR emitter may be adapted to the IR absorption bands of any of the components of the aerosol-forming substrate. The IR emitter may be adapted to the IR transmission of any of the components of the aerosol-forming substrate.

According to another aspect of the invention there is provided a shisha device comprising the aerosol-generating element as above described. In one or more embodiments, the shisha device may further comprise an air conduit and a liquid vessel.

In use, the generated aerosol may flow through an aerosol conduit. The aerosol conduit may also be referred to herein as a stem pipe. The aerosol conduit comprises a proximal end portion defining a proximal opening positioned to receive airflow from the aerosol-generating element. The conduit comprises a distal end portion defining a distal opening positioned in an interior of a vessel. The vessel is configured for receiving a liquid therein, up to a liquid fill level. The aerosol conduit is in fluid communication with the vessel. An airflow channel may be defined between the aerosol-generating element and the interior of the vessel. In particular, the aerosol-generating element is in fluid communication with the vessel, by means of the conduit. The interior of the vessel comprises a lower volume for receiving liquid and an upper volume for head space. The vessel comprises a head space outlet in fluid communication with the upper volume of the vessel, above the liquid fill level. In some embodiments, a hose may be connected to the head space outlet. A mouthpiece may be coupled to the hose for puffing on by a user of the shisha device.

The vessel may include an optically transparent or opaque housing to allow a consumer to observe contents contained in the vessel. The vessel may include a liquid fill demarcation, such as a liquid fill line. The vessel housing may be formed of any suitable material. For example, the vessel housing may include glass or suitable rigid plastic material. Preferably, the vessel is removable from a portion of the shisha device having the aerosol-generation element to allow a consumer to fill or clean the vessel.

The vessel may be filled to a liquid fill level. The liquid preferably comprises water, which may optionally be infused with one or more colorants, flavourants, or colorant and flavourants. For example, the water may be infused with one or both of botanical or herbal infusions. In some embodiments, the aerosol may be altered by being pulled through the liquid.

Air may be flowed through the aerosol-generating element to draw aerosol from the aerosol-generating element through an aerosol conduit. The aerosol conduit may define an airflow channel. Airflow may exit the shisha device through a head space outlet of the vessel. Air may flow through the aerosol conduit by application of a negative pressure at the head space outlet. The source of negative pressure may be suction or puffing of a user. In response, aerosol may be drawn through the aerosol conduit, through the liquid contained in the interior of the vessel. The user may suction a mouthpiece in fluid communication with the head space outlet to generate or provide the negative pressure at the head space outlet or mouthpiece. In some embodiments, airflow may enter an aerosol-forming substrate receptacle of the shisha device, flow along or across the aerosol-forming substrate, and may become entrained with aerosol. Aerosol-entrained air may then flow from an outlet in the receptacle through the conduit, to the vessel.

As used herein, the term “downstream” refers to a direction along the aerosol conduit toward the interior of the vessel from the aerosol-generating element. The term “upstream” refers to a direction opposite to the downstream direction, or a direction along the aerosol conduit toward the aerosol-generating element from the interior of the vessel.

The aerosol conduit is positioned between the aerosol-generating element and the interior of the vessel. The aerosol conduit may comprise one or more components along the aerosol conduit. The aerosol conduit comprises a proximal end portion defining a proximal opening positioned to receive airflow from the aerosol-generating element. The aerosol conduit comprises a distal end portion defining a distal opening positioned in the interior of the vessel. The distal end portion of the aerosol conduit may extend into a volume of liquid in the interior of the vessel during use of the shisha device.

The aerosol conduit may be described as defining a longitudinal axis extending through the proximal end portion and the distal end portion. A lateral direction may be defined orthogonal to the longitudinal axis. For example, a cross-section, circumference, width, or diameter of the aerosol conduit may be defined in the lateral direction, or in a plane orthogonal to the longitudinal axis.

According to yet another aspect of the invention there is provided an aerosol-generating system comprising the shisha device of the invention and an aerosol-generating article. Generally, the aerosol-generating article is a consumable which is removably mounted in the receptacle of the aerosol generating-element. The aerosol-generating article comprises the aerosol-forming substrate.

In one or more embodiments, the aerosol-generating article consists of the aerosol-forming substrate. For example, the aerosol-generating article may be loose shisha molasses. In one or more embodiments, the aerosol-generating article comprises a cartridge comprising an outer shell enclosing the aerosol-forming substrate.

Generally, the receptacle is configured to receive the aerosol-forming substrate or the aerosol-generating article. Thus, the receptacle is configured to receive an aerosol-forming substrate or a cartridge containing the aerosol-forming substrate.

The receptacle may comprise any suitable number of apertures in communication with one or more air inlet channels. In some embodiments, the receptacle may comprise 1 to 1000 apertures, such as 1 to 500 apertures. The apertures may be of uniform size or non-uniform size. The apertures may be of uniform or non-uniform shape. The apertures may be uniformly distributed or non-uniformly distributed. The apertures may be formed in the receptacle at any suitable location. For example, the apertures may be formed in one or both of a top or a bottom of the receptacle. Preferably, the apertures are formed in the bottom of the receptacle.

The receptacle is preferably shaped and sized to allow contact between one or more wall or ceiling of the receptacle and the aerosol-forming substrate or a cartridge comprising the aerosol-forming substrate when the substrate or cartridge is received by the receptacle. Advantageously, this facilitates conductive heating of the aerosol-forming substrate by the heating element.

Preferably, the interior of the receptacle and the exterior of a cartridge comprising the aerosol-forming substrate are of similar size, shape and dimensions. Preferably, the interior of the receptacle has a height to a base width (or diameter) ratio of greater than about 1.5 to 1. Preferably, the exterior of the cartridge has a height to a base width (or diameter) ratio of greater than about 1.5 to 1. Such ratios may allow for more efficient depletion of the aerosol-forming substrate within the cartridge during use by allowing heat from the heating elements to penetrate to the middle of the cartridge. For example, the receptacle and cartridge may have a base diameter (or width) about 1.5 to about 5 times the height, or about 1.5 to about 4 times the height, or about 1.5 to about 3 times the height. Similarly, the receptacle and cartridge may have a height about 1.5 to about 5 times the base diameter (or width), or about 1.5 to about 4 times the base diameter (or width), or about 1.5 to about 3 times the base diameter (or width). Preferably, the receptacle and cartridge have a height to base diameter ratio or base diameter to height ratio of from about 1.5 to 1 to about 2.5 to 1.

In some embodiments, the interior of the receptacle and the exterior of the cartridge each have a base diameter in a range from about 15 millimeters to about 30 millimeters and a height in a range from about 40 millimeters to about 60 millimeters.

The receptacle may be formed from one or more parts. Preferably, the receptacle is formed by two or more parts. Preferably, at least one part of the receptacle is movable relative to another part to allow access to the interior of the receptacle for inserting the cartridge into the receptacle. For example, one part may be removably attachable to another part to allow insertion of the aerosol-forming substrate or the cartridge containing the aerosol-forming substrate when the parts are separated. The parts may be attachable in any suitable manner, such as through threaded engagement, interference fit, snap fit, or the like. In some embodiments, the parts are attached to one another via a hinge. When the parts are attached via a hinge, the parts may also comprise a locking mechanism to secure the parts relative to one another when the receptacle is in a closed position. In some embodiments, the receptacle comprises a drawer that may be slid open to allow the aerosol-forming substrate or cartridge to be placed into the drawer and may be slid closed to allow the shisha device to be used.

Any suitable aerosol-generating article, for at least partially housing the aerosol-forming substrate may be used with a shisha device as described herein. The aerosol-generating article may comprise a cartridge. The cartridge, the contents of the cartridge, or both the cartridge and the contents of the cartridge may be arranged to be heated by the heating element. Alternatively, aerosol-forming substrate that is not provided in a cartridge may be placed in the receptacle.

Preferably, the cartridge comprises a thermally conductive body. For example, the body may comprise any one of: aluminium, copper, zinc, nickel, silver, and combinations of one or more thereof. Preferably, the body comprises aluminium. In some embodiments, the cartridge comprises one or more material less thermally conductive than aluminium. For example, the body may comprise any suitable thermally stable polymeric material. If the material is sufficiently thin that sufficient heat may be transferred through the body to the aerosol-forming substrate housed therein, despite the body being formed from material that is not particularly relatively thermally conductive.

The cartridge may comprise one or more apertures. In some embodiments, the one or more apertures may be formed in the top and bottom of the body to allow air flow through the cartridge when in use. If the top of the receptacle comprises one or more apertures, at least some of the apertures in the top of the cartridge may be aligned with the apertures in the top of the receptacle. The cartridge may comprise an alignment feature configured to mate with a complementary alignment feature of the receptacle to align the apertures of the cartridge with the apertures of the receptacle when the cartridge is inserted into the receptacle. The apertures in the body of the cartridge may be covered during storage to prevent aerosol-forming substrate stored in the cartridge from spilling out of the cartridge. In addition, or alternatively, the apertures in the body of the cartridge may have dimensions sufficiently small to prevent or inhibit the aerosol-forming substrate from exiting the cartridge. If the apertures are covered, a consumer may remove the cover prior to inserting the cartridge into the receptacle. In some embodiments, the shisha device is configured to puncture the cartridge to form apertures in the cartridge. In some embodiments, the receptacle of the shisha device is configured to puncture the cartridge to form apertures in the cartridge.

The cartridge may be of any suitable shape. Preferably, the cartridge has a frusto-conical or cylindrical shape.

The cartridge may have a lid. The lid may be removable. The removable lid may be removed before the aerosol-generating element is used to irradiate the aerosol-forming substrate in the cartridge. This may minimise energy losses through the absorption of an interface material and may maximize direct irradiation of the aerosol-forming substrate. The cartridge may be re-usable, such that a user buys the substrate separately and loads the substrate manually, instead of buying pre-prepared shisha cartridges. This may provide the benefit of more resembling the traditional shisha ritual.

In one or more embodiments, the aerosol-generating article comprises a cartridge comprising an outer shell enclosing the aerosol-forming substrate, and the aerosol-generating element is configured to either one of directly heating the aerosol-forming substrate within the cartridge, or directly heating the outer shell of the cartridge and indirectly heating the aerosol-forming substrate within the cartridge via the outer shell of the cartridge.

The shisha device may comprise control electronics operably coupled to the resistive heating element, induction coil, the photonic device, the optical element and/or the movable optical mount. The control electronics are configured to control heating of the heating element.

The control electronics may be provided in any suitable form. The control electronics may comprise a controller. The control electronics may comprise a memory. The memory may comprise instructions that cause one or more components of the shisha device to carry out a function or aspect of the control electronics. Functions attributable to control electronics in this disclosure may be embodied as one or more of software, firmware, and hardware. The memory may be a non-transient computer readable storage medium.

In particular, one or more of the components, such as controllers, described herein may comprise a processor, such as a central processing unit (CPU), computer, logic array, or other device capable of directing data coming into or out of the control electronics. The controller may comprise one or more computing devices having memory, processing means, and communication hardware. The controller may comprise circuitry used to couple various components of the controller together or with other components operably coupled to the controller. The functions of the controller may be performed by hardware. The functions of the controller may be performed by instructions stored on a non-transient computer readable storage medium. The functions of the controller may be performed by both hardware and by instructions stored on a non-transient computer readable storage medium.

Where the controller comprises a processor, the processor may, in some embodiments, comprise any one or more of a microprocessor, a microcontroller, a digital signal processor (DSP), an application specific integrated circuit (ASIC), a field-programmable gate array (FPGA), and equivalent discrete or integrated logic circuitry. In some embodiments, the processor may comprise multiple components, such as any combination of one or more microprocessors, one or more controllers, one or more DSPs, one or more ASICs, and one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and interfaces may be implemented using one or more computer programs using a computing apparatus, which may comprise one or more processors, memory, or both memory and one or more processors. Program code, logic or both code and logic described herein may be applied to input data or information to perform functionality described herein and generate desired output data/information. The output data or information may be applied as an input to one or more other devices or methods as described herein or as would be applied in a known fashion. In view of the above, it will be readily apparent that the controller functionality as described herein may be implemented in any manner known to one skilled in the art.

In some embodiments, the control electronics may comprise a microprocessor, which may be a programmable microprocessor. The electronic circuitry may be configured to regulate a supply of power. The power may be supplied to the heater element or induction coil in the form of pulses of electrical current.

If the heating element comprises a resistive heating element, in some embodiments, the control electronics may be configured to measure or monitor the electrical resistance of the heating element. In some embodiments, the control electronics may be configured to control the supply of power to the heating element depending on the electrical resistance of the heating element. In this manner, the control electronics may regulate the temperature of the resistive element.

If the heating components comprise an induction coil and the heating element comprises a susceptor material, in some embodiments, the control electronics may be configured to monitor aspect of the induction coil. In some embodiments, the control electronics may be configured to control the supply of power to the induction coil depending on the aspects of the coil such as described in, for example, WO 2015/177255. In this manner, the control electronics may regulate the temperature of the susceptor material.

The shisha device may comprise a temperature sensor. The temperature sensor may comprise a thermocouple. The temperature sensor may be operably coupled to the control electronics to control the temperature of the heating elements. The temperature sensor may be positioned in any suitable location. For example, the temperature sensor may be configured to insert into the aerosol-forming substrate or a cartridge received within the receptacle to monitor the temperature of the aerosol-forming substrate being heated. In addition, or alternatively, the temperature sensor may be in contact with the heating element. In addition, or alternatively, the temperature sensor may be positioned to detect temperature at an aerosol outlet of the shisha device, such as the aerosol outlet of the aerosol-generating element. In addition, or alternatively, the temperature sensor may be in contact with the cooling element, such as the heated side of the heat pump. The sensor may transmit signals regarding the sensed temperature to the control electronics, which may adjust heating of the heating elements to achieve a suitable temperature at the sensor.

Any suitable thermocouple may be used, such as a K-type thermocouple. The thermocouple may be placed in the cartridge where the temperature is lowest. For example, the thermocouple may be placed in the centre, or middle, of the cartridge. In some shisha devices, the thermocouple may be placed underneath the aerosol-forming substrate (such as molasses), for example, by placing the thermocouple between the substrate receptacle and the heating element (such as charcoal) and then placing substrate on top.

Regardless of whether the shisha device comprises a temperature sensor, the device is preferably configured to heat an aerosol-forming substrate received in the receptacle to an extent sufficient to generate an aerosol without combusting the aerosol-forming substrate.

The control electronics may be operably coupled to a power supply of the shisha device. The shisha device may comprise any suitable power supply. For example, a power supply of a shisha device may be a battery or set of batteries (such as a battery pack). In some embodiments, one or more than one component of the battery, such as the cathode and anode elements, or even the entire battery may be adapted to match geometries of a portion of a shisha device in which they are disposed. In some cases, the battery or battery component may be adapted by rolling or assembling to match geometries. The batteries of power supply unit may be rechargeable. The batteries of the power supply may be removable and replaceable. Any suitable battery may be used. For example, heavy duty type or standard batteries existing in the market, such as used for industrial heavy duty electrical power-tools. Alternatively, the power supply unit comprise be any type of electric power supply comprising a super or hyper-capacitor. In some embodiments, the shisha device may be connectable to an external electrical power source, and electrically and electronically designed for such purpose. Regardless of the type of power supply employed, the power supply preferably provides sufficient energy for the normal functioning of the shisha device for at least approximately 30 minutes, preferably at least approximately 50 minutes, more preferably for at least approximately 70 minutes of continuous operation of the device, before being recharged or needing to connect to an external electrical power source.

The shisha device may comprise an accelerating element. Aerosol-entrained air may depressurize upon passing through one or more accelerating elements. The aerosol-entrained air then continues through a stem pipe, into the vessel, and then may be inhaled by the user. The accelerating element may be positioned along the aerosol conduit, such as along the airflow channel of the aerosol conduit. In particular, the accelerating element may be positioned along the aerosol conduit. The accelerating element may integrally form part of the airflow channel or aerosol conduit. The accelerating element may be configured to accelerate aerosol that flows through the accelerating element.

The shisha device may comprise a cooling element. The cooling element may be disposed along the airflow channel or aerosol conduit. The cooling element may integrally form part of the airflow channel or aerosol conduit. The cooling element is configured to cool aerosol in the airflow channel, particularly air that flows through or past the cooling element. The cooling element may be disposed downstream from the aerosol-generating element along the airflow channel. In particular, the cooling element may be disposed between the aerosol-generating element and the end of the airflow channel, or at least between the aerosol-generating element and the vessel. Further, the cooling element may be positioned adjacent to, or as close as possible, to a deceleration chamber, or deceleration portion of the stem pipe, which may promote rapid cooling for aerosol production. The cooling element may utilize passive cooling, active cooling, or both. The cooling element may comprise a conduit of thermally conductive material.

According to another aspect of the invention, there is provided a method for forming an aerosol in a shisha device. According to the method a beam of IR radiation is generated by means of a photonic device. Further, the beam of IR radiation is directed from the photonic device to an aerosol-forming substrate received in a receptacle of the shisha device. Finally, the aerosol-forming substrate received in the receptacle is heated by means of the beam of IR radiation. Consequently, the temperature of the aerosol-forming substrate increases upon absorption of the IR light. The temperature of the aerosol-forming substrate may increase upon absorption of the IR light until it reaches the vaporization temperature at which an aerosol is formed.

In one or more embodiments of the method, a wavelength of the beam of IR radiation is selected to correspond to a wavelength at which at least a component of the aerosol-forming substrate absorbs IR radiation.

In one or more embodiments of the method, the method comprises manipulating the beam of IR radiation prior to heating the aerosol-forming substrate received in the receptacle of the shisha device by means of the beam of IR radiation. In some embodiments of the method, manipulating the beam of IR radiation comprises using one or more optical elements to manipulate the IR beam of radiation. In some embodiments, the one or more optical elements may be provided on a movable mount. Different portions of the aerosol-forming substrate may therefore be selectively heated, for example, in a sequential manner.

In some embodiments of the method, the method comprises, manipulating the beam of IR radiation dynamically. In some embodiments, said dynamic manipulation may be achieved by means of a movable mount of the optical element, such that different portions of the aerosol-forming substrate are selectively heated, for example, in a sequential manner.

In one or more embodiments of the method, the method comprises heating the aerosol-forming substrate by an additional electric heating means. Thus, the aerosol-forming substrate may be concurrently heated by both the beam of IR radiation and the additional electrical heating means.

For purposes of example, one method for using a shisha device as described herein is provided below in chronological order. The vessel may be detached from other components of the shisha device and filled with water. One or more of natural fruit juices, botanicals, and herbal infusions may be added to the water for flavouring. The amount of liquid added should cover a portion of the main conduit but should not exceed a fill level mark that may optionally exist on the vessel. The vessel is then reassembled to the shisha device. A portion of the aerosol-generating element may be removed or opened to allow the aerosol-forming substrate or the cartridge to be inserted into the receptacle. The aerosol-generating element is then reassembled or closed. The device may then be turned on. A user may puff from a mouth piece until a desired volume of aerosol is produced to fill the chamber having the air-accelerating inlet. The user may puff on the mouth piece as desired. The user may continue using the device until no more aerosol is visible in the chamber. Preferably, the device will automatically shut off when the cartridge or substrate is depleted of usable aerosol-forming substrate. Alternatively, or in addition, the consumer may refill the device with fresh aerosol-forming substrate or a fresh cartridge after, for example, receiving the cue from the device that the consumables are depleted or nearly depleted. If refilled with fresh substrate or a fresh cartridge, the device may continue to be used. Preferably, the shisha device may be turned off at any time by a consumer by, for example, switching off the device.

In some examples, a user may activate one or more heating elements by using an activation element on, for example, the mouthpiece. The activation element may be, for example, in wireless communication with the control electronics and may signal control electronics to activate the heating element from standby mode to full heating. Preferably, such manual activation is only enabled while the user puffs on the mouthpiece to prevent overheating or unnecessary heating of aerosol-forming substrate in the cartridge.

In some examples, the mouthpiece comprises a puff sensor in wireless communication with the control electronics and puffing on the mouthpiece by a consumer causes activation of the heating elements from a standby mode to full heating.

A shisha device of the invention may have any suitable air management. In one example, puffing action from the user will create a suction effect causing a low pressure inside the device which will cause external air to flow through air inlet of the device, into the air inlet channel, and into the receptacle of the aerosol-generating element. The air may then flow through aerosol-forming substrate or a cartridge containing the substrate in the receptacle to carry aerosol through the aerosol outlet of the receptacle. The aerosol then may flow into a first aperture of the air-accelerating inlet of the chamber (unless the outlet of the aerosol-generating element also serves as the air-accelerating inlet of the chamber). As the air flows through the inlet of the chamber the air is accelerated. The accelerated air exits the inlet through a second aperture to enter the main chamber of the chamber, where the air is decelerated. Deceleration in the main chamber may improve nucleation leading to enhanced visible aerosol in the chamber. The aerosolized air then may exit the chamber and flow through the main conduit (unless the main conduit is the main chamber of the chamber) to the liquid inside the vessel. The aerosol will then bubble out of the liquid and into head space in the vessel above the level of the liquid, out the headspace outlet, and through the hose and mouthpiece for delivery to the consumer. The flow of external air and the flow of the aerosol inside the shisha device may be driven by the action of puffing from the user.

Preferably, assembly of all main parts of a shisha device of the invention assures hermetic functioning of the device. Hermetic function should assure that proper air flow management occurs. Hermetic functioning may be achieved in any suitable manner. For example, seals such as sealing rings and washers maybe used to ensure hermetic sealing.

Sealing rings and sealing washers or other sealing elements may be made of any suitable material or materials. For example, the seals may include one or more of graphene compounds and silicon compounds. Preferably, the materials are approved for use in humans by the U.S. Food and Drug Administration.

Main parts, such as the chamber, the main conduit from the chamber, a cover housing of the receptacle, and the vessel may be made of any suitable material or materials. For example, these parts may independently be made of glass, glass-based compounds, polysulfone (PSU), polyethersulfone (PES), or polyphenylsulfone (PPSU). Preferably, the parts are formed of materials suitable for use in standard dish washing machines.

In some examples, a mouthpiece of the invention incorporates a quick coupling male/female feature to connect to a hose unit.

The electronic, IR heated shisha device may operate as follows. A cartridge filled with an aerosol-forming substrate may be heated by IR radiation. To this end the aerosol generating element directs IR radiation onto the aerosol-forming substrate. The aerosol generating element may be configured such that the temperature provided is sufficient to generate an aerosol without combusting, or burning, the aerosol-forming substrate. A user may draw air from the electric shisha, air may enter via an air inlet channel, pass the cooling element, go along a cartridge, then toward a bottom of the cartridge, then to a bottom of the receptacle. The generated aerosol may be accelerated while passing through an accelerating element. Before or during acceleration, the generated aerosol may be cooled by the cooling element to increase condensation in the aerosol. The aerosol may experience a pressure change upon entering a chamber and expand inside the chamber, which may decelerate the aerosol, before passing through a main conduit, or stem pipe, that is partly immersed in water in a lower volume of a vessel. The generated aerosol passes through the water and expands in an upper volume of the vessel before being extracted by a hose.

In one or more embodiments of the method, the aerosol-forming substrate comprises shisha molasses.

According to an aspect of the present invention, there is provided a non-transitory computer readable medium comprising software for executing the method as above described.

According to an aspect of the present invention, there is provided a controller configured for implementing the method as above described. In some embodiments, said controller comprises software for executing the method as above described. In some embodiments, the software is provided as part of the controller in a non-transitory computer readable medium as above described.

All scientific and technical terms used herein have meanings commonly used in the art unless otherwise specified. The definitions provided herein are to facilitate understanding of certain terms used frequently herein.

Features described in relation to one aspect may equally be applied to other aspects of the invention.

The invention will be further described, by way of example only, with reference to the accompanying drawings in which:

Figure 2:
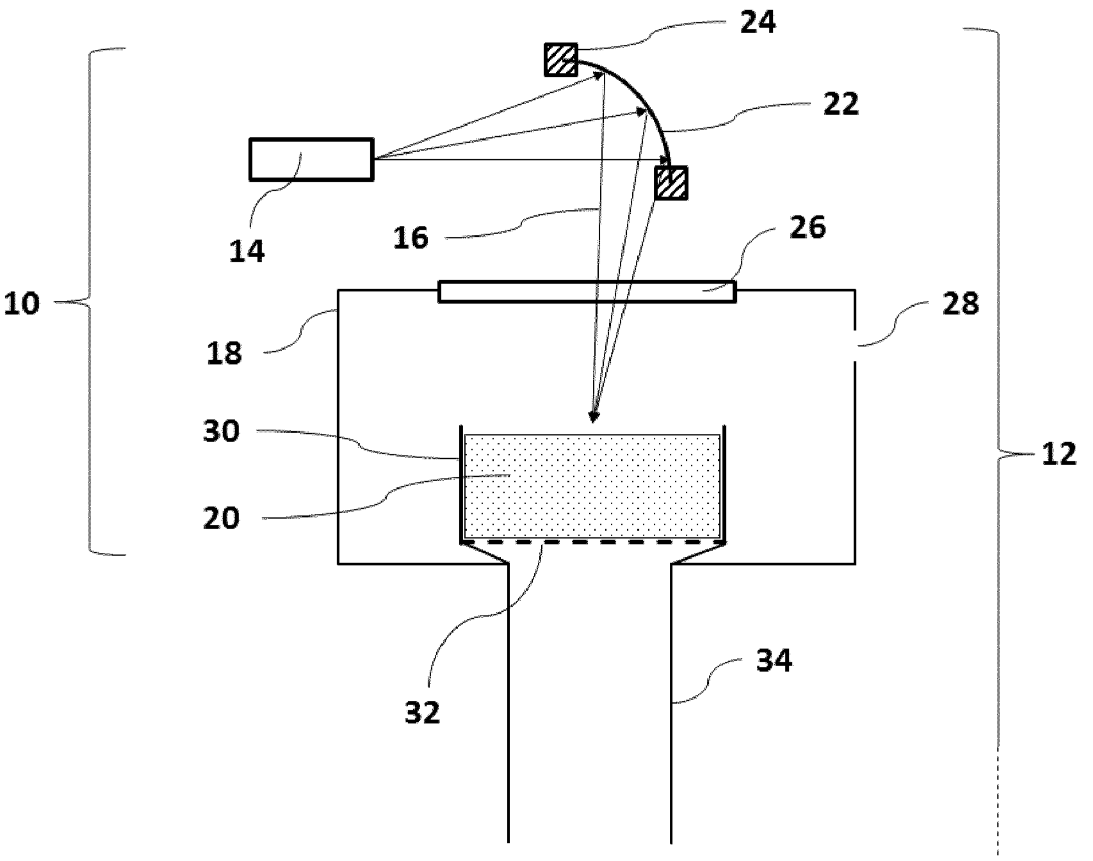
FIG. 2 shows an aerosol generating element of the invention according to another embodiment.

A shisha device 100 comprises an aerosol-generating element 10 configured to receive an aerosol-forming substrate 20 (see FIG. 2). The aerosol-generating element 10 may heat the aerosol-forming substrate 20, for example, by means of IR radiation as discussed below with respect to FIG. 2, to generate an aerosol. In use, the generated aerosol flows through an aerosol conduit. The aerosol conduit may be provided as part of a stem pipe 34. The aerosol conduit comprises a proximal end portion defining a proximal opening 42 positioned to receive airflow from the aerosol-generating element 10 and a distal end portion defining a distal opening 44 positioned in an interior of a vessel 46.

The stem pipe 34 is in fluid communication with the vessel 46. An airflow channel is defined between the aerosol-generating element 10 and the interior of the vessel 46. In particular, the aerosol-generating element 10 is in fluid communication with a vessel 46, by means of stem pipe 34 at least partially defining the airflow channel. The interior of the vessel 46 comprises an upper volume 48 for head space and a lower volume 49 for liquid. A hose 52 is in fluid communication with the upper volume 48 through a head space outlet 54 formed in a side of the vessel 46 above a liquid line. A mouthpiece 56 is coupled to hose 52 for a user of the shisha device 100.

Generated aerosol may flow through the aerosol-generating element 10, through the air flow channel via the stem pipe 34 into the lower volume 49. The aerosol may pass through liquid in the lower volume 49 and rise into the upper volume 48. Puffing by a user on the mouthpiece 56 of the hose 52 may draw the aerosol in the upper volume 48 through the head space outlet 54, into the hose 20 for inhalation. In particular, negative pressure at the mouthpiece 56 may translate into negative pressure at head space outlet 54 causing airflow through the aerosol-generating element 10 and stem pipe 34.

Figure 1:
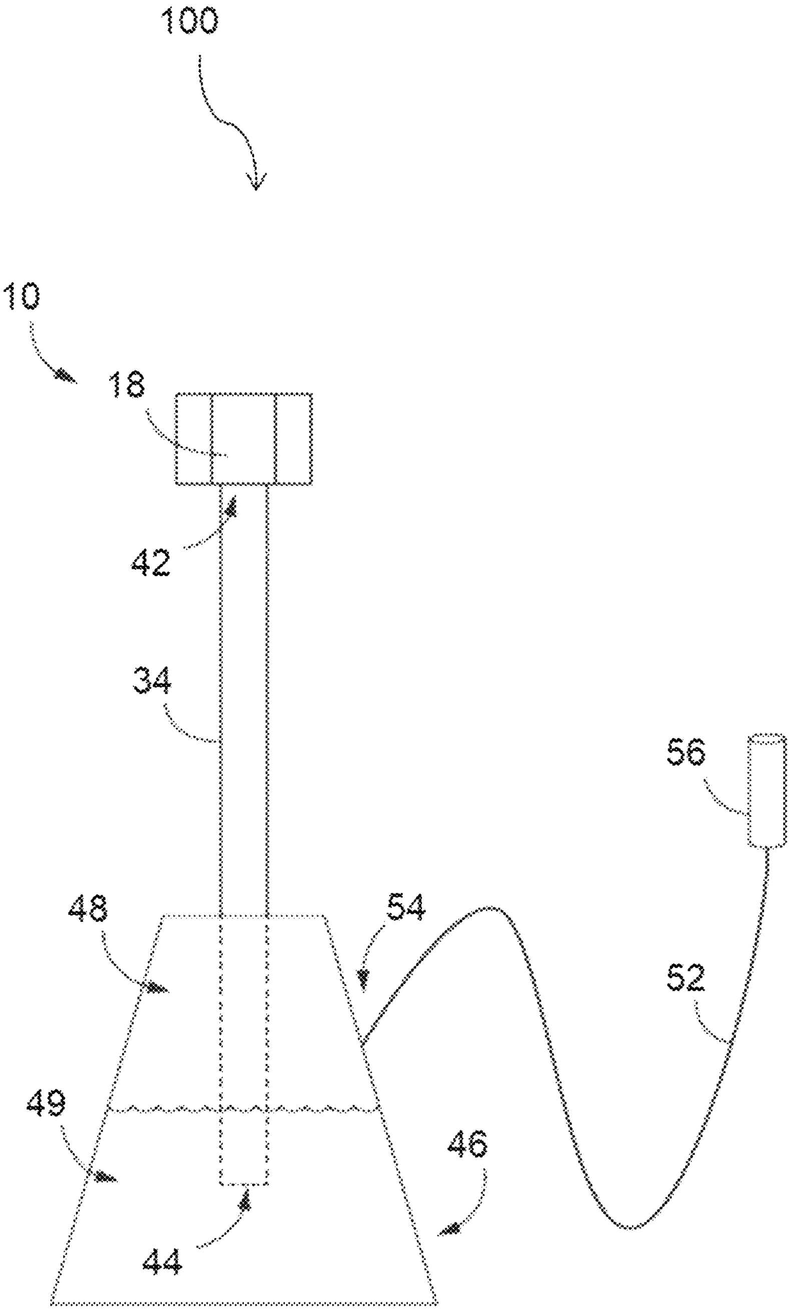
FIG. 1 shows a shisha device including an aerosol generating element of the invention.

FIG. 2 shows an embodiment of an aerosol-generating element 10 of the invention for generating an aerosol as part of the shisha device 100 of FIG. 1. Aerosol-generating element 10 comprises a photonic device 14 configured to generate and emit a beam of IR radiation 16. In the embodiment of FIG. 2, the beam of IR radiation 16 is generated by an IR laser diode emitting radiation with a wavelength of between 1300 nanometers and 2000 nanometers at a power of between 1 Watt and 20 Watts. The aerosol-generating element 10 further comprises a receptacle 18 for receiving an aerosol-forming substrate 20. The aerosol-generating element 10 is arranged to heat the aerosol-forming substrate 20 by directing the beam of IR radiation 16 from photonic device 14 onto the aerosol-forming substrate 20 received in the receptacle 18. An optical element 22 is located in a path of the beam of IR radiation 16 between the photonic device 14 and the receptacle 18. The optical element 22 is configured to manipulate the beam of IR radiation 16. In the embodiment of FIG. 2 optical element 22 comprises a curved mirror for manipulating the beam of IR radiation 16 by reflecting the beam 16 such that the beam 16 changes direction. Preferably, the radius of the curved mirror is not fixed but rather can be manipulated dynamically by means of, for example, water or air pressure.

Optical element 22 is mounted in the aerosol-generating element 10 by means of an optical mount 24. In the embodiment shown in FIG. 2, the beam of IR radiation 16 comprises an incident beam of IR radiation propagating from the photonic device 14 towards the curved mirror and a reflected beam of IR radiation propagating from the curved mirror to the receptacle 18. The curved mirror reflects the beam of IR radiation 16, changing the direction of the beam to a new direction, which direction is at an angle of approximately 90 degrees relative to the original direction of the beam. Thus, there is an angle of approximately 90 degrees between the incident beam of IR radiation and the reflected beam of IR radiation.

However, other angles of reflection may be adjusted if desired. The optical mount 24 may be movable in order to adjust different angles of reflection. The position on the aerosol-forming substrate 20 at which the beam of IR radiation 16 irradiates the substrate may be manipulated dynamically by movable optical mount 24. For example, the angle of rotation of the curved mirror with respect to the incident IR beam can be manipulated using a movable optical mount 24. For example, the movable optical mount 24 may comprise a microstructured assembly of stepper motors. Thus, selective heating of discrete portions of the aerosol-forming substrate 20 may be achieved. Selective heating may therefore enable sequential heating of different portions of the aerosol-forming substrate 20 to be accomplished.

The embodiment of FIG. 2 further comprises a window 26 located at a position in between optical element 22 and the receptacle 18 and being substantially transparent to the beam of IR radiation 16. The reflected beam of IR radiation 16 is transmitted into the receptacle 18 through window 26. Window 26 prevents accumulation of residues on the surface of the laser diode and on the curved mirror.

FIG. 2 further indicates several details of a working example of the aerosol-generating element 10 in a shisha device 12.

For allowing airflow into the device, the receptacle 18 comprises at least one air inlet 28. Within the receptacle 18, there may be received the aerosol-forming substrate 20. The aerosol-forming substrate 20 may be provided as part of an aerosol-generating article provided within a capsule 30. In some embodiments, a lid of the capsule 30 may be opened or removed prior to heating. In some embodiments, such as, for example, the illustrated embodiment, the capsule 30 is placed at a distance of up to 5 centimeters from the IR laser diode. In some embodiments, such as, for example, the illustrated embodiment, capsule 30 has no lid. This may help to prevent or at least reduce energy losses by the absorption of an interface material. This may also help to maximize direct irradiation of the aerosol-forming substrate 20.

Upon absorption of the beam of IR radiation 16 the temperature of the aerosol-forming substrate 20 increases until reaching a temperature where vapor is generated and an aerosol is formed in the receptacle 18. A bottom side of capsule 30 is provided with an airflow outlet, such as one or a plurality of apertures 32 for enabling airflow through the capsule 30.

Generally, air enters receptacle 18 through air inlet 28, passes through aerosol-forming substrate 20, and exits capsule 30 through apertures 32 placed on the bottom side of capsule 30. Subsequently, the generated aerosol passes through the stem pipe 34 into water and accumulates on the headspace of the vessel 46 (not shown in FIG. 2). The aerosol then passes through a headspace outlet, through a hose to a mouthpiece (features not shown in FIG. 1) where the aerosol may be inhaled by a user.

Figure 3:
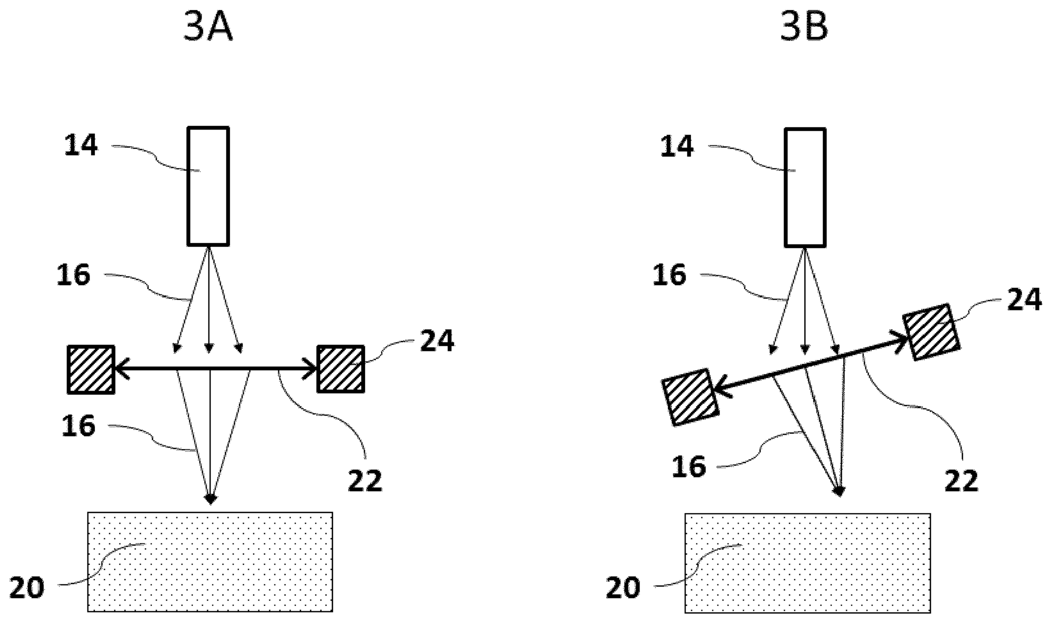
FIGS. 3A and 3B show an aerosol generating element of the invention according to another embodiment.

FIGS. 3A and 3B show another embodiment of parts of an aerosol-generating element 10 of the invention. The receptacle is not shown in FIGS. 3A and 3B. In contrast to the embodiment of FIG. 2, optical element 22 of the embodiment of FIGS. 3A and 3B comprises a convex lens. As can be seen from FIGS. 3A and 3B the convex lens of optical element 22 manipulates the beam of IR radiation 16 to converge after passing through the optical element 22. Converging and thus focusing of the beam of IR radiation 16 increases the energy density of the IR radiation beam 16. A focused beam allows for a rapid depletion of specific areas of the aerosol-forming substrate 20.

Further, optical element 22 comprises a movable optical mount 24 for dynamically manipulating the trajectory of the beam of IR radiation 16. This is visualized by the different orientations of the axis of the convex lens of optical element 22 in FIGS. 3A and 3B. Thus, FIGS. 3A and 3B show two of a number of different configurations of the optical element as may be adjusted via the movable optical mount 24. Movement of the movable optical mount 24 may be realized by stepper motors. As can be seen from FIGS. 3A and 3B, movement of optical mount 24 manipulates the trajectory of the focused beam 16. Manipulating the trajectory of the focused beam of IR radiation 16 manipulates where exactly the beam of IR radiation 16 will fall incident on the aerosol-forming substrate 20. As a consequence, aerosol-forming substrate 20 can be irradiated in a selective fashion. The aerosol-forming substrate 20 may therefore be irradiated in a sequential fashion. The pace at which the beam trajectory is manipulated may be set either by a manufacturer or by the user according to their own preference. Such a configuration may be particularly useful for a puff on demand shisha system.

Figure 4:
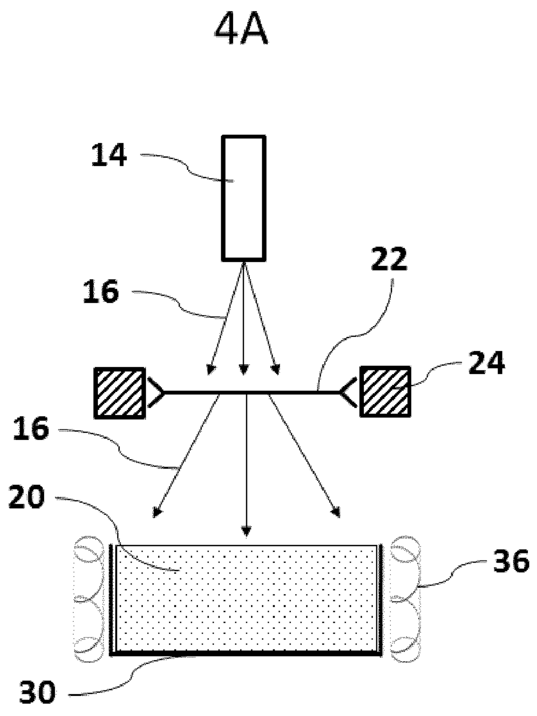
FIG. 4A shows an aerosol generating element of the invention according to another embodiment.
FIG. 4B shows an aerosol generating element of the invention according to another embodiment.

FIG. 4A shows another embodiment of parts of an aerosol-generating element 10 of the invention. Again, the receptacle is not shown in FIG. 4A. The aerosol-forming substrate 20 is provided within an open lid capsule 30. Other than in the previously described embodiments, in the embodiment of FIG. 4A optical element 22 comprises a concave lens. As can be seen from FIG. 4A the concave lens of optical element 22 manipulates the beam of IR radiation 16 to diverge the beam of IR radiation 16 after having passed through optical element 22. Such a configuration is particularly useful to maintain the substrate at the correct temperature for long time intervals where no puffing occurs, such as pre-heat time periods or in between puffs.

The aerosol-generating element 10 of the embodiment of FIG. 4A further comprises an additional electrical heating means. The additional electrical heating means comprises a resistive heating means 36. In this embodiment, the beam of IR radiation 16 is conceived as a depletion agent, meaning that aerosol formation takes place substantially only where the beam of IR radiation 16 irradiates the aerosol-forming substrate 20. The heating means 36 maintains the substrate at a constant temperature below a vaporization temperature of the aerosol-forming substrate. The IR heating means provides the additional energy needed to bring one or more compounds of the aerosol-forming substrate 20 to a temperature at or above the vaporization temperature, to generate aerosol.

FIG. 4B shows another embodiment of parts of an aerosol-generating element 10 of the invention. Again, the receptacle is not shown in FIG. 4B. The embodiment of FIG. 4B is similar to the embodiment of FIG. 4A. The focused beam of IR radiation 16 is conceived as a depletion agent and aerosol formation takes place substantially only at a distinct portion of the aerosol-forming substrate 20 where the focused beam of IR radiation 16 irradiates the aerosol-forming substrate 20.

The embodiment of FIG. 4B differs from the embodiment of FIG. 4A in that the optical element 22 of FIG. 4B includes a convex lens instead of a concave lens.

Optical element 22 of FIG. 4B comprises a movable optical mount 24 for dynamically manipulating the trajectory of the beam of IR radiation 16. This configuration is similar to the configuration of the optical element 22 and movable optical mount 24 of the embodiment of FIGS. 3A and 3B.

The aerosol-forming substrate 20 may therefore be irradiated by the beam of IR radiation 16 in a sequential fashion.

Figure 5:
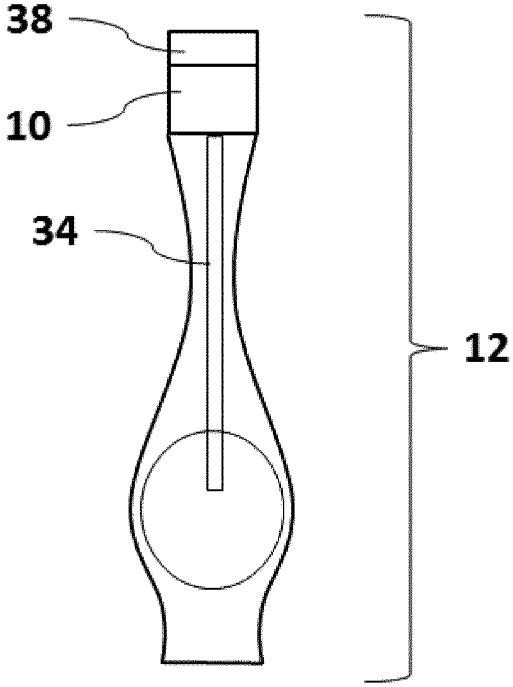
FIG. 5A shows a shisha device on the invention according to an embodiment, the shisha device comprising an aerosol-generating element of the invention.
FIG. 5B shows a control unit for use with the aerosol generating element of the invention.
Figure 5:
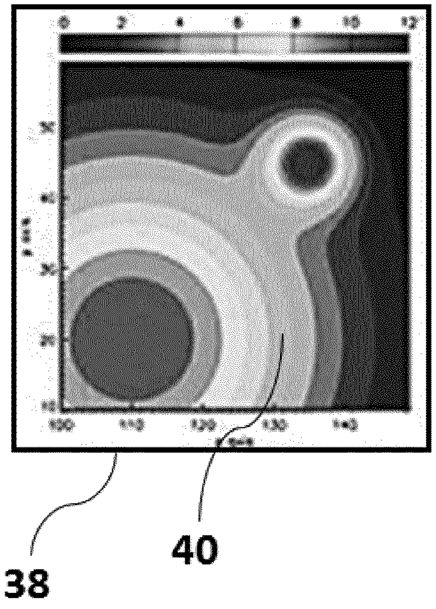

FIGS. 5A and 5B show a control unit 38 for use with the aerosol-generating element 10 of the invention. Control unit 38 may maximize the ritual preservation in the non-charcoal operated shisha device 12 of the invention.

FIG. 5A shows in side view control unit 38 being located on top of the aerosol-generating element 10. Further, stem pipe 34 of shisha device 12 is indicated. FIG. 5B shows control unit 38 in top view comprising a user interface 40. The user interface 40 comprises a display. The display visualizes heated areas of the aerosol-forming substrate by means of a contour map. Additionally, the display may show which parts of the aerosol-forming substrate 20 have already been consumed. The display further has the function of a user input means, in the form of a touch screen. Accordingly, when control unit 38 is used, for example, with embodiments wherein the aerosol-generating element 10 comprises means for manipulating the beam of IR radiation 16, such as, for example, the embodiment shown in FIGS. 3A and 3B, the user can input which area of the aerosol-forming substrate 20 should be heated. For example, a user may tap or press and hold an area on the display touch screen to control a position to which the IR beam of radiation 16 is directed. By this action, the stepper motors of the movable optical mount 24 actively direct the beam of IR radiation 16 to the signalled point in the aerosol-forming substrate 20.

Figure 6:
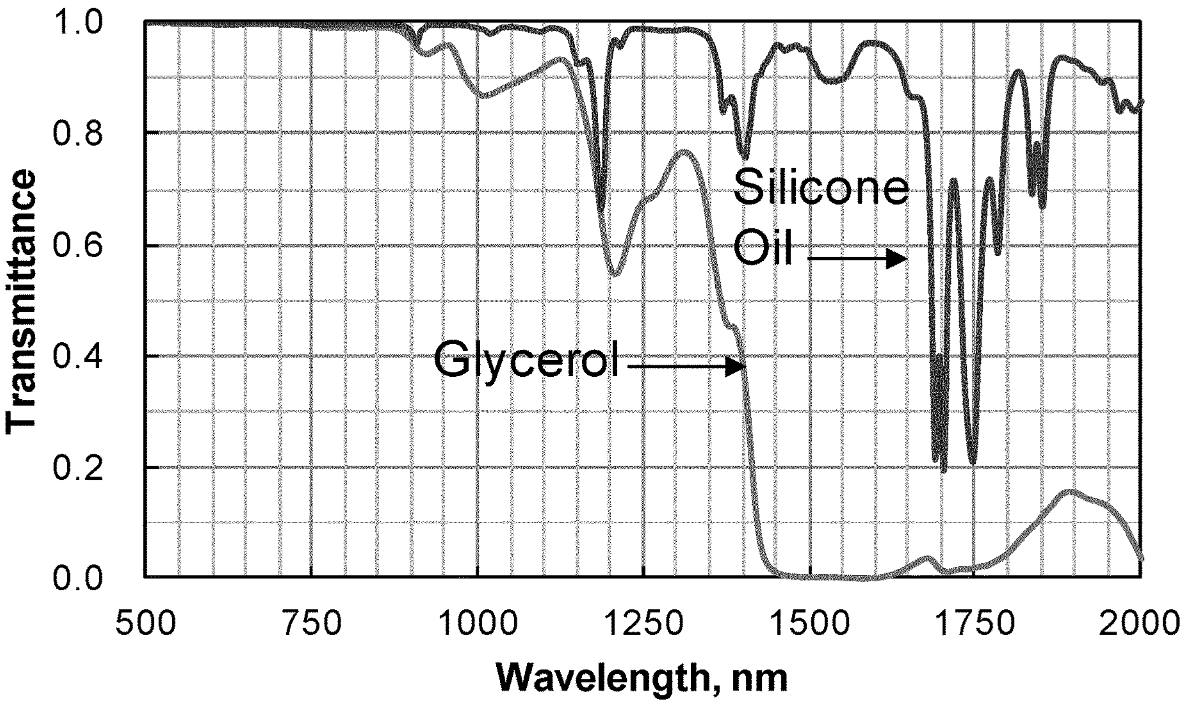
FIG. 6 shows an IR spectrum of glycerol.

A typical substrate used with shisha devices, such as Al-Fakher double apple molasses, may have a composition of, for example, 15 to 30 percent of tobacco, 45 to 55 percent of glycerol and 15 to 30 percent of sugar. As can be seen in the IR spectrum of glycerol depicted in FIG. 6 (from Xu, M., Wang, X., Jin, B. and Ren, H. Micromachines 2014, 6 (2), 186-195) glycerol has strong absorption bands in the range between 1300 and 2000 nanometers. Accordingly a suitable IR emitter to be used with the shisha device of the present invention may be, for example, a laser diode able to emit light at a wavelength of between 1300 and 2000 nanometers.

In some embodiments, in order to allow for appropriate use of the shisha device, the IR laser diode should be able to pre-heat the exposed part of the substrate from room-temperature up to a target temperature of about 200 centigrade within about 4 minutes. After this pre-heat phase, a constant evaporation over typically usage period of about 40 minutes should be facilitated by the heating power of the IR emitter.

Assuming that about a third of the total substrate material, that is the material at the surface of the substrate, is exposed to the light and heated via IR radiation, it can be concluded that the IR laser diode should provide a pre-heating power of between 7 and 20 watts.

After the target temperature of 200 centigrade is reached, a shisha is typically used for about 40 minutes and the operating temperature needs to be kept constant during this usage period at the target temperature. In this usage period typically a total of 2.8 grams of the molasses substrate is evaporated. Given the above composition of the Al-Fakher double apple molasses, for such evaporation a continuous reduced radiation power of between 1 to 3 watts is required.

In the given example the power density requirements for pre-heating Al-Fakher double apple molasses within 4 minutes to a target temperature of 200 centigrades is about 1 to 1.5 watts per square centimeter. During use of the shisha device the power density of the IR laser diode may be reduced to about 0.3 to 0.7 watts per square centimetre.

The invention claimed is:

1. An aerosol-generating element for generating an aerosol in a shisha device, the aerosol-generating element comprising:

a receptacle for receiving an aerosol-forming substrate; and a photonic device configured to generate a beam of IR radiation;

wherein the aerosol-generating element is arranged to heat the aerosol-forming substrate by directing the beam of IR radiation onto the aerosol-forming substrate, wherein the photonic device comprises an IR laser diode, wherein a range of wavelengths of the beam of IR radiation is from 1300 nanometers to 2000 nanometers.

2. The aerosol-generating element according to claim 1, wherein a wavelength of the beam of IR radiation corresponds to a wavelength at which at least a component of the aerosol-forming substrate absorbs IR radiation.

3. The aerosol-generating element according to claim 1, wherein a diameter of the beam of IR radiation is in the range of from 1 millimeter to 110 millimeters.

4. The aerosol-generating element according to claim 1, wherein power of the beam of IR radiation is in the range of from 0.1 Watt to 30 Watts.

5. The aerosol-generating element according to claim 1, wherein energy density of the beam of IR radiation may be in a range of from 0.010 Watt per square centimeter to 30 Watts per square centimeter.

6. The aerosol-generating element according to claim 1, further comprising an optical element being located between the photonic device and the receptacle and being configured to manipulate the beam of IR radiation.

7. The aerosol-generating element according to claim 6, wherein the optical element is arranged on a movable optical mount for dynamically manipulating the beam of IR radiation.

8. The aerosol-generating element according to claim 6, further comprising a window being located between the photonic device and the receptacle and being substantially transparent for the beam of IR radiation.

9. The aerosol-generating element according to claim 8, wherein the aerosol-generating element comprises the optical element and, wherein the window is located at a position in between the optical element and the receptacle.

10. The aerosol-generating element according to claim 6, wherein the beam of IR radiation comprises an incident beam of IR radiation propagating from the photonic device towards the optical element and a reflected beam of IR radiation propagating from the optical element to the receptacle, and wherein there is an angle between the incident beam of IR radiation and the reflected beam of IR radiation, preferably, wherein the angle is about 90 degrees, wherein the optical element comprises a curved mirror for reflecting the beam of IR radiation, wherein the curved mirror can be manipulated dynamically.

11. The aerosol-generating element according to claim 6, wherein the optical element comprises one or both of:

a concave lens for diverging the beam of IR radiation in a direction towards the receptacle; and a convex lens for converging the beam of IR radiation in a direction towards the receptacle.

12. The aerosol-generating element according to claim 1, further comprising an electrical heating means arranged for heating the aerosol-forming substrate received in the receptacle.

13. The aerosol-generating element according to claim 1, further comprising a control unit for a user to select a specific portion of the receptacle to be heated.

14. A shisha device comprising the aerosol-generating element of claim 1.

15. An aerosol-generating system comprising the shisha device of claim 14, wherein the aerosol-forming substrate is arranged to be received in the receptacle of the aerosol-generating element of the shisha device, and wherein the aerosol-forming substrate is arranged to be heated by the aerosol-generating element of the shisha device.

16. The aerosol-generating system according to claim 15, comprising a cartridge comprising an outer shell enclosing the aerosol-forming substrate.

17. The aerosol-generating system according to claim 15, wherein the aerosol-forming substrate comprises shisha molasses.

18. A method for forming an aerosol in a shisha device, the method comprising:

(a) generating a beam of IR radiation by a photonic device, wherein the photonic device comprises an IR laser diode, wherein a range of wavelengths of the beam of IR radiation is from 1300 nanometers to 2000 nanometers, (b) directing the beam of IR radiation from the photonic device to an aerosol-forming substrate received in a receptacle of the shisha device, and (c) heating the aerosol-forming substrate received in the receptacle of the shisha device by the beam of IR radiation.

* * * * *